May 1, 1951  J. O. GRAVES  2,551,560
MOTHER MANIKIN FOR TEACHING APPROVED PRACTICE
OF OBSTETRICS AND MIDWIFERY
Filed Oct. 18, 1950

INVENTOR
Julia O. Graves

BY Mason, Fenwick & Lawrence
ATTORNEYS

UNITED STATES PATENT OFFICE 2,551,560

MOTHER MANIKIN FOR TEACHING APPROVED PRACTICE OF OBSTETRICS AND MIDWIFERY

Julia Oleander Graves, Savannah, Ga.

Original application December 27, 1949, Serial No. 135,156. Divided and this application October 18, 1950, Serial No. 190,858

2 Claims. (Cl. 35—17)

This invention relates to educational apparatus for teaching, by means of demonstration, the approved practice of obstetrics.

There are many sections of the country in which modern knowledge and procedure in the practice of obstetrics is not wide spread, but in which, on the contrary, the majority of child births are entrusted to midwives whose training is limited to that acquired through experience. It is upon the supposition that the older the midwife the more experience she has, that the more elderly midwives have gained a prestige over the younger members of the group, so that they bring to the childbed traditional practices which do not make sense, and some of which are positively detrimental to the welfare of mother and child.

The practice is reflected in the statistics which show that in those places where the practice of obstetrics is for the most part left to unlicensed midwives with no standard of qualifications, the mortality rate of mothers, as well as new born babies, is much greater than in the more favored sections where hospitalization and scientific technique are the customary resort.

State agencies endeavoring to raise the standard of obstetrical qualifications are confronted with the alternative of refusing to license the great bulk of midwives, or of offering them as a condition to eligibility for a license, a short course in the only practical method of training that is adapted to their very limited educational status, that is, by a system of demonstration. The first alternative is impractical, since there are not enough qualified nurses to go around, and in the hinterlands where the need for improved knowledge and methods is greatest, the people would resort to the midwives, licensed or not.

The present invention represents one of the correlated phases in a system of instruction by means of which a qualified instructor can demonstrate to a class of limited literacy, in an interesting and easily understood manner, the phenomena of parturition and the procedures required in a normal delivery, as well as the more common exigencies of birth encountered sooner or later in the experience of the midwife. The system comprises these elements, employed singly and in combination.

(a) The mother manikin.
(b) The fetus doll.
(c) The placenta, per se, or in combination with the fetus.

Said three elements or features are disclosed in my pending application Serial Number 135,156, filed December 27, 1949. The present application covers the mother manikin, and is a divisional application, out of said pending application, by official requirement.

One of the objects of the invention is to provide a mother manikin substantially full size, having an abdominal cavity open at the front, selectively closable by one of three ventral covers of different degrees of convexity, copied from nature, representing the shape at the three trimestral periods of pregnancy, by means of which the midwife can learn to judge by observation how far the gestation period has run, in the examination of her patients.

Another object of the invention is to provide a mother manikin as described, in which the abdominal cavity is sufficiently capacious to enable the instructor using a full size flexible jointed fetus doll to demonstrate the several positions which the fetus may occupy in the abdomen at the time of delivery.

Still another object of the invention is to provide the mother manikin with a flexible and expansible vagina forming a wall of the abdominal cavity, sufficiently large to permit the fetus doll to pass through it.

Another object of the invention is to make the mother manikin with jointed head and limbs so that various positions assumed by the mother can be demonstrated, such as the knee-chest attitude, useful in retarding delivery.

Other objects of the invention will appear as the following description of a preferred and practical embodiment thereof proceeds.

In the drawings throughout the figures of which the same reference characters have been used to denote the same part:

Figure 1:
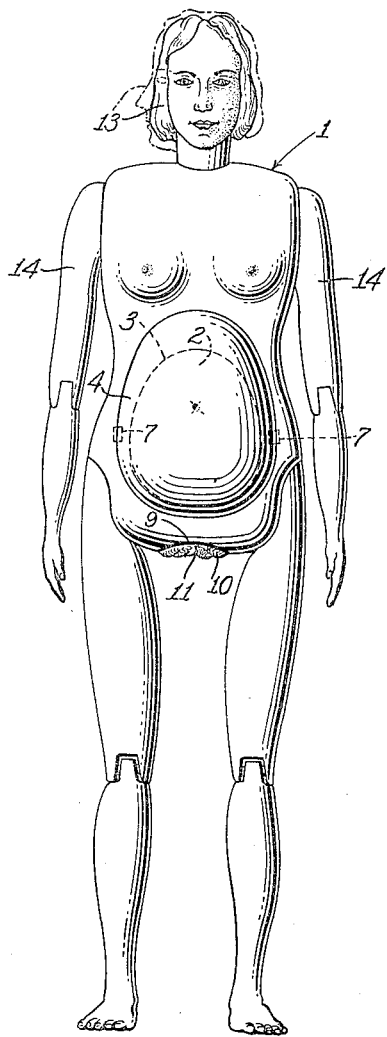
Figure 1 is a front elevation of the mother manikin.
Figure 2:
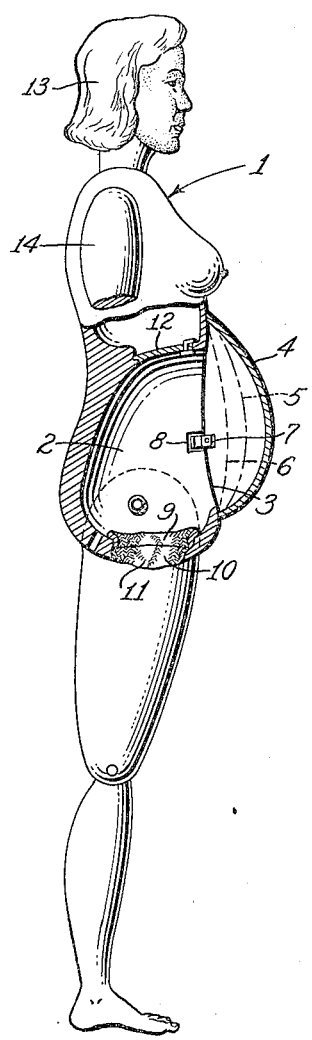
Figure 2 is a side elevation, partly in section.

Referring now in detail to the figures, the numeral 1 represents the mother manikin as a whole, which preferably has the size and general likeness of an actual woman, the head, arms and legs being preferably jointed, as shown, so that the manikin can be made to assume various positions of which the human body is capable. The manikin may be made of any suitable material such as papier-mâché, plastic, etc., and may be covered with a skin coat of latex or other material simulating skin in appearance and to the touch.

The manikin 1 is provided with an abdominal cavity 2, which opens in the ventral surface of the body, and which is sufficiently capacious to contain a full sized fetus doll, with enough room to permit the instructor to move the fetus doll within the abdominal cavity to demonstrate various "lays." The ventral opening 3 is provided with three closures, 4, 5, and 6, adapted to be selectively employed to show the characteristic shape of the abdominal wall at the end of each of the three trimesters of the gestation period, useful in cultivating the ability of the student midwife to determine approximately the stage of pregnancy attained by her patients.

The contour of these closures is a faithful replica of the shape of the actual abdomen at the stated periods of pregnancy. The interfacial edges of the ventral opening 3 and the respective closures 4, 5, and 6 is planiform, and any suitable means for detachably securing the closures is within the purview of the invention. The illustrated embodiment shows spring tongues 7, riveted one on each side of the closure, which snap into corresponding recesses 8 in the inner wall of the abdominal cavity. The closure may be removed by grasping it on opposite sides and pulling it in a direction away from the body against the resistance of the spring tongues.

The lower part of the wall of the abdominal cavity is provided with an opening 9, of such size as to let the head of the fetus doll pass through it, this opening being covered by a flexible yielding membrane 10, of suitable material such as rubber, formed with a vaginal opening 11 of normal size capable of stretching to permit the passage of the fetus doll. The vagina is preferably made as life-like as possible, and the external genitalia may be represented.

The fetus doll (not shown in this application), having been placed in the abdominal cavity, the instructor by pushing it step by step against the vaginal membrane from the inside, can demonstrate the progress of normal as well as unusual deliveries and teach the student how to manage the same.

The head 13 of the mother manikin is turnable, the arms 14 jointed at shoulders and elbow, and the legs at hip and knee, so that the mother manikin can be placed in any of the positions which it is advantageous for the patient to assume, incident to delivery. The upper part of the abdominal cavity has a removable door 12, through which access can be had to the joint mechanism (not shown), of the head and arms, for tightening the same when required.

While I have in the above description disclosed what I believe to be a preferred and practical embodiment of my invention, it will be understood by those skilled in the art that the specific details of construction and shape of the parts may be altered without departing from the spirit and scope of the invention.

What I claim as my invention is:

1. In an educational device for teaching midwifery, a mother manikin having an abdominal cavity open at the front, and a series of selectively usable closures for the front opening of said cavity having different convex contours simulating the abdominal shape at different stages of the gestation period.

2. In an educational device for teaching midwifery, a mother manikin having an abdominal cavity open at the front, a flexible stretchable wall at its lower end provided with a vaginal opening therethrough, and a series of selectively usable closures for the front opening of said cavity having different convex contours simulating the abdominal shape at different stages of the gestation period.

JULIA OLEANDER GRAVES.

No references cited.